UNITED STATES PATENT OFFICE.

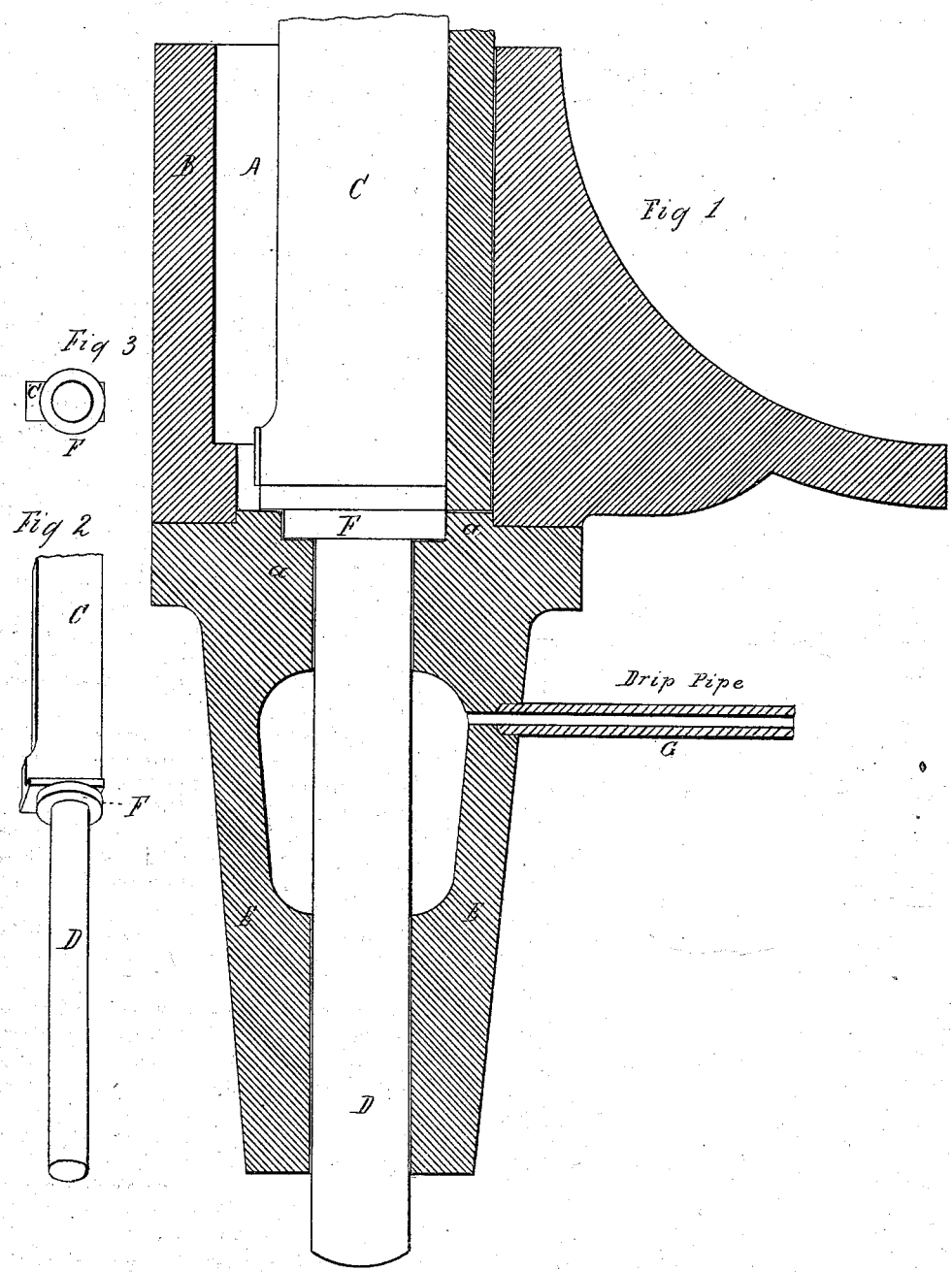

GEORGE R. BABBITT, OF PROVIDENCE, R. I., ASSIGNOR, BY MESNE ASSIGNMENT, TO HIMSELF AND WILLIAM A. HARRIS, OF SAME PLACE.

IMPROVEMENT IN STEAM-TIGHT JOINTS OF VALVE-STEMS.

Specification forming part of Letters Patent No. 135,876, dated February 18, 1873.

*To all whom it may concern:*

Be it known that I, GEORGE R. BABBITT, of the city and county of Providence, and State of Rhode Island, have invented a new and useful Improvement in Steam-Tight Joints of Valve-Stems; and I do hereby declare that the following specification, taken in connection with the drawing, is a full, clear, and exact description thereof.

My improvement is specially designed to be used in connection with the rotating slide-valves used in the Corliss engine and the steam-engines employing similar valves, or a rotating valve-stem. In such engines the valves have curved faces and slide upon correspondingly-curved seats, and the stems of such valves consequently vibrate on their axes.

It has been customary heretofore to pack the stems at the joint by means of glands and compressing-screws outside the steam-chest, as in engines employing valve-rods which slide in the direction of their length.

Inasmuch as the valves in this class of engines are detached from the mechanism which opens them at variable periods of the stroke of the piston, to enable them to be closed by weights or springs, which act to close the valves in advance of the return movement of the valve-gear, it is especially desirable that a uniform resistance at the steam-joints of the valve-stems should exist to be overcome by the weights or springs, rather than a resistance which is variable by reason of carelessness or ignorance on the part of the engineer in setting up the glands too tight on the packing of the joints. The improvement hereinafter described is also valuable to be applied to the exhaust-valves, as in all cases when it is applicable it saves the wearing away of the valve-stem by the effect of grit, which collects in the fibrous packing commonly used.

In the drawing, A represents the valve, and B the valve-seat. C is that part of the valve-stem or valve-holder which is inside the valve-chest; and D, the valve stem or rod, which is outside the chest, and upon the end of which is the toe, with which the valve-gear engages to rock the valve, to enable the port to be opened. E is a standard or bracket, projecting from the side of the steam-chest and bolted thereto, through which the valve-rod passes, and by which the latter and the valve connected with it, is sustained and supported in their proper relation, all of which is familiar to constructors of steam-engines. At the inner end of the bracket E, and concentric with the hole for the valve-rod, a recess, *a*, is cut. A collar, F, is then shrunk upon the valve-rod or otherwise tightly fitted thereto so as to make a flange, and turned off and faced to fit the recess when the valve, valve-rod, and bracket are in their proper relation. The face of the flange F and the seat of the recess *a* should also be ground so as to make a steam-tight joint.

If, now, the parts are put together as shown in the drawing, and steam applied to the engine, the pressure in the cylinder and steam-chest upon the valve will cause the face of the flange F to bear hard against the ground seat upon which it works, and maintain a steam-tight joint without any other packing being necessary.

G is a drip-pipe for carrying off any condensed steam which may leak through the joint.

The improvement described accomplishes a considerable saving in construction, dispensing, as it does, with the cost of stuffing-boxes and their adjuncts of glands and compressing-screws.

What I claim as new, and desire to secure by Letters Patent, is—

The combination of the recessed bracket E and flanged stem F D, substantially as described, for maintaining a tight joint for a rotating valve-stem in place of a packed stuffing-box, as set forth.

GEO. R. BABBITT.

Witnesses:
EDWIN C. PIERCE,
THOMAS T. COSGROVE.